Sept. 20, 1966 L. W. PAGE 3,274,347

MEANS FOR MOUNTING AN ERASER HEAD TO A RECORD HEAD

Filed March 4, 1963

INVENTOR.
LEO W. PAGE

BY Price & Heneveld

ATTORNEYS

United States Patent Office 3,274,347

Patented Sept. 20, 1966

3,274,347
MEANS FOR MOUNTING AN ERASER HEAD TO A RECORD HEAD

Leo W. Page, Potterville, Mich., assignor to Michigan Magnetics, Inc., Vermontville, Mich., a corporation of Michigan Filed Mar. 4, 1963, Ser. No. 262,524
4 Claims. (Cl. 179—100.2)

This invention concerns head assemblies for magnetic tape recorders, and particularly a combination erase and recording head which automatically assures correct alignment of the two heads with respect to one another.

In the manufacture of magnetic tape recorders, the correct alignment of the erase head with respect to the recording head has long been a vexing problem. Alignment tolerances in this type of equipment have always been minute and are becoming ever more so with the increasing miniaturization of recording equipment. Even a small error in alignment can cause considerable difficulty due to a slight non-coincidence of the record track and the erase track, as a result of which the record track is not fully erased before being re-recorded.

Further, the connection of the erase head to the record head has created difficulties due to the small size of the parts (e.g., less than ½ inch overall height) in that it has heretofore required complex mounting brackets, alignment and adjustment means, and intricate assembly processes which required an undue amount of skilled labor.

The present invention solves this problem by providing an erase head which, instead of being separately mounted to the chassis and then aligned, is simply snapped onto the side of the record head in a predetermined position which automatically provides a good mechanical connection as well as an automatic alignment whose quality is determined only by the manufacturing tolerances of the parts. Furthermore, a preferred construction of the erase head of this invention is such that once snapped onto a record head, the erase head cannot be removed therefrom without special tools or without breaking the attachment prongs. This assures that the alignment of the heads will not be disturbed by incompetent service personnel.

It is the object of this invention to provide an erase head which can be easily and firmly mounted on a record head so as to provide automatic alignment of the two heads.

It is a further object of the invention to provide such mounting means which make possible an easy and foolproof assembly of the two heads and maintain their relative position in spite of vibration or mechanical tempering.

These and other objects of this invention will become apparent from the following specification, taken in connection with the accompanying drawings in which.

Basically, the erase head of this invention utilizes the mounting block which mounts the electrical terminals in the erase head to also mount the erase head on the metallic shield of the record head. For this purpose, the mounting block of the erase head is provided with a pair of resilient prongs which hook over the edges of the shield of the recording head and firmly hold the erase head thereagainst by virtue of their resiliency.

At the same time, the construction of this invention results in a material saving in that the shield of the erase head can be omitted on the side of the record head, the shield of the record head serving as a common shield for both heads when the heads are assembled.

Figure 1:
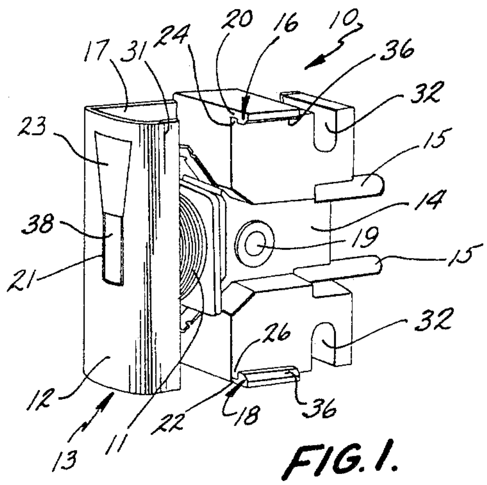
FIG. 1 is a perspective view of the erase head of this invention.

Referring to the drawings, the erase head 10 best shown in FIG. 1 consists of an electromagnet winding 11 wound on a strip-like magnetic core whose front end 38 is flush with the front portion 12 of a generally J-shaped metal shield 13. A magnetic gap is created between the core face 38 and the portion 12 of the magnetizable shield 13 by a thin U-shaped copper spacer 21. Distortion of the magnetic flux at the gap causes magnetic tape drawn across the gap to be erased. An aperture 23 in shield portion 12 immediately above core face 38 is formed for manufacturing purposes not pertinent to this invention. This aperture may be filled with any magnetically nonpermeable material such as a synthetic resin.

The winding 11 is excited by an alternating current of a frequency several times that of the upper limit of the audible range which is fed to it by appropriate apparatus (not shown) connected to the winding terminals 15. The rear end of the magnetic core is gaplessly bonded to the side portion 17 of the magnetizable shield 13. Terminals 15 are supported in a mounting block 14 of generally hard yet somewhat resilient insulating material such as polyethylene. The mounting block 14 is attached to the leg 17 of the shield 13 by a rivet 19.

Figure 3:
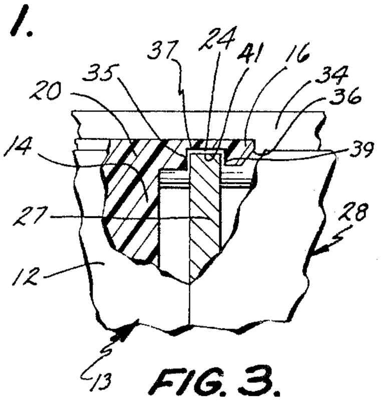
FIG. 3 is a fragmentary front elevation, partly in section, showing the manner of engagement of the erase head with the record head.

As best shown in FIG. 3, the block 14 is provided with a pair of prongs 16, 18 integrally formed therewith and connected thereto by thin bridge portions 20, 22. The bridge portions 20, 22 are sufficiently thin to be flexible. The block, bridge portions, and prongs cooperate to form recesses 24, 26 of a size just adequate to receive the upper and lower edges of the side portion 27 of the shield 28 of a recording head 30 in tight-fitting relationship. The engagement of edge 41 of portion 27 with recess 24 is shown in detail in FIG. 3. Transverse grooves 32 are formed in the mounting block 14 to receive the mounting bolts 34 of the recording head 30. The location of the mounting bolts 34 in the grooves 32 assures proper relative depthwise (i.e., front-to-rear) alignment of the heads 10 and 30.

Figure 2:
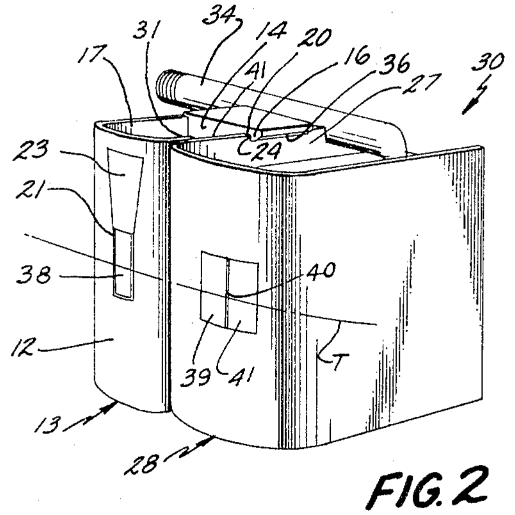
FIG. 2 is a perspective view showing the erase head of this invention attached to a record head.

To assemble the erase head 10 with the recording head 30, it is merely necessary to slip the erase head from left to right in FIGS. 2 and 3 between the mounting bolts 34 and press it against the record head 30 until the lip 31 of shield 13 engages the outside of portion 27 and the prongs 16, 18 snap over the edges of portion 27 of shield 28. The engagement in metal-to-metal contact of the lip 31 with the portion 27 causes the portion 27 to do double duty in the assembled combination as a shield element for both the erase head 10 and the record head 30.

The inclined faces 36 of the prongs 16, 18 spread the prongs as the erase head 10 is forced against the record head 30 so as to help the prongs 16, 18 to slip over the edges of the shield 28. It will be noted that due to the right-angular relationship of the faces 35, 37, 39 of the recess 24, the prong 16 prevents the erase head 10 from being pulled off the recording head 30 once the prong 16 has snapped into position on the right side (in FIG. 3) of the portion 27 of shield 28. The same is true with respect to recess 26. The tolerances of the recesses 24, 26 and shield 28 are such that when the erase head 10 has been snapped into position on the record head 30, the center line of the vertical legs of the erase gap spacer 21 and that of the record gap spacer 40 interposed between the pole pieces 39, 41 of the record head core are identical. The common center line is designated as T in FIG. 2.

The combination erase and record head of FIG. 2 can be mounted on any appropriate mounting plate (not shown) by the mounting bolts 34.

It will be seen that the present invention provides a simple, material-saving, yet effective way of factory-aligning an erase head with a record head and maintaining their alignment. With the device of this invention, it is further possible to replace the erase head in the field without any alignment tools merely by breaking or cutting off one of the prongs 16 or 18, removing the old erase head, and slipping a new erase head 10 into position. When the new erase head is snapped into place, it will automatically be aligned equally well as was the old one.

Obviously, the present invention is capable of being carried out in many different ways, of which the embodiment shown and described herein is merely illustrative. I therefore do not wish to be limited by the embodiment shown and described, but only by the scope of the following claims.

I claim:

1. A head assembly for tape recorders, comprising: a first head having a shield member disposed in a plane generally normal to the plane of a tape passing over said head; and a second head having prong means flexibly formed thereon, said prongs extending laterally from said second head; said prong means being dimensioned to engage edges of said shield member to hold said second head in a fixed predeterminable position with respect to said first head.

2. A head assembly for tape recorders, comprising: a first head having a shield member disposed in a plane generally normal to the plane of a tape passing over said head; and a second head having a shield member and a terminal block fixed thereto, said terminal block having prong means flexibly formed thereon, said prongs extending laterally from said second head beyond the lateral extremity of its shield member; said prong means defining a recess dimensioned to snugly engage edges of said shield member of said first head to hold said second head at a fixed predeterminable height with respect to said first head.

3. A head assembly for tape recorders, comprising: a first head having a shield member disposed in a plane generally normal to the plane of a tape passing over said head, and mounting bolt means extending generally parallel to said plane; and a second head having a terminal block fixedly mounted on said head, said terminal block having prong means flexibly formed thereon, said prongs extending laterally from said second head, and said terminal block having a transverse groove means formed therein to receive said bolt means of said first head; said prong means being dimensioned to engage edges of said shield member, and said prong means, shield member, groove means, and bolt means cooperating to hold said second head in a fixed predeterminable position with respect to said first head.

4. A head assembly for tape recorders, comprising: a first head having a shield member generally U-shaped in horizontal cross-section, said shield member including a flat portion disposed in a vertical plane generally normal to the plane of a tape passing over said head and laterally extending mounting bolt means; and a second head having a shield member generally J-shaped in horizontal cross section, and a terminal block affixed thereto, said block having prong means flexibly formed thereon, and having groove means formed therein for engaging said bolt means; said prong means extending laterally from said second head on the side opposite the shank of said J; said prong means being dimensioned to engage edges of said flat portion and to resiliently irreleasably grasp than to hold said second head in a fixed predeterminable position with respect to said first head, said prong means, flat portion, groove means, and bolt means cooperating to hold said second head in such a position that the end of said J opposite its shank abuts against said shield member of said first head.

References Cited by the Examiner

UNITED STATES PATENTS

| | | | |
|---|---|---|---|
| 2,880,280 | 3/1959 | Gernert et al. ______ | 179—100.2 |

FOREIGN PATENTS

| | | |
|---|---|---|
| 1,134,215 | 8/1962 | Germany. |
| 1,136,128 | 9/1962 | Germany. |

Davenport et al.: "Dual Recording Head," Aug. 2, 1959, IBM Technical Disclosure, vol. 2, No. 2, p. 34.

BERNARD KONICK, *Primary Examiner.*

A. F. BERNARD, *Assistant Examiner.*